UNITED STATES PATENT OFFICE.

JAKOB SCHMID, OF BASLE, SWITZERLAND, ASSIGNOR TO THE SOCIETY OF CHEMICAL INDUSTRY, OF SAME PLACE.

BISMUTH-OXYIODIN TANNATE.

SPECIFICATION forming part of Letters Patent No. 604,571, dated May 24, 1898.

Application filed August 17, 1897. Serial No. 648,590. (Specimens.)

*To all whom it may concern:*

Be it known that I, JAKOB SCHMID, chemist, a citizen of the Swiss Republic, residing at Basle, Switzerland, have invented new and useful Improvements in the Manufacture of Therapeutical Products, of which the following is a specification.

I have discovered that new products of high therapeutic value can be obtained from tannic acids and bismuth-oxyiodid or the reagents by which the latter is produced—that is to say, a soluble bismuth salt and an iodin salt. These new products are suitable both as powders for wounds and for use in the preparation of bandage-gauze.

The property the new products have of fixing themselves with advantage on bandage-gauze is due to the tannin employed and is explained by the fact that the bismuth tannate contained therein readily fixes itself on vegetable fibers in a similar manner to the antimony tannate of the tannin and tartar emetic employed, as is well known, as a mordant in dyeing.

Example: Thirty parts of crystallized bismuth nitrate are dissolved in five parts of water, with the addition of three parts of nitric acid, and to this solution are added twelve parts of a twenty-per-cent. sodium-acetate solution. A greatly-diluted aqueous solution of nineteen and five-tenths parts tannin and nine and five-tenths parts potassium iodid is then added to the mixture while being well stirred, when a dark-brown precipitate will at once be produced. A dilute solution of ten and eight-tenths parts of sodium bicarbonate is now added, when the previously brown precipitate assumes a light gray color. The mass is allowed to stand for some time, is then filtered, washed with a small quantity of water, pressed, and dried. The monobismuth-oxyiodid lake of tannin thus produced seems to correspond with the following formula—

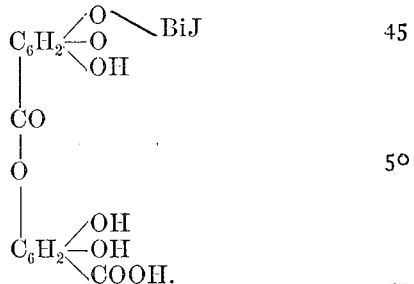

It forms a gray powder which, is quite insoluble in water. On boiling with water the gray color of the compound changes to a yellowish color and is disassociated with the emanation of an acid odor. The new compound is also decomposed under the influence of acids and alkalies, and slowly even in a humid atmosphere. On long exposition to light the gray color of the new compound turns to brown. The process for the preparation of this bismuth-oxyiodid lake of tannin can be modified, without alteration of the final result, in such manner that first bismuth-tannin lake is produced as an intermediate body, and then this body is converted into the iodid compound by treatment with an iodin salt. The tannin (gallotannic acid) can also in some cases be replaced by other tannic acids.

The new products are especially intended for the preparation of bandage-gauzes and ointments, as also for antiseptic powders.

What I claim is—

1. The process for the production of a bismuth-oxyiodid lake of tannic acid, consisting in bringing one molecule of bismuth oxyiodid into reaction with one molecule of a tannic acid, as described.

2. As a new article of manufacture the described bismuth-oxyiodid lake of tannin consisting of a gray powder which is quite insoluble in water and is disassociated by acids
5 and alkalies, the gray coloration of the compound turning to yellow, with emanation of an acid odor, when it is boiled with water.

In witness whereof I have hereunto signed my name in the presence of two subscribing witnesses.

JAKOB SCHMID.

Witnesses:
AUGUST ROOS,
GEORGE GIFFORD.